Osburn & Walzen,
Plow.
No. 86,245. Patented Jan. 26, 1869.
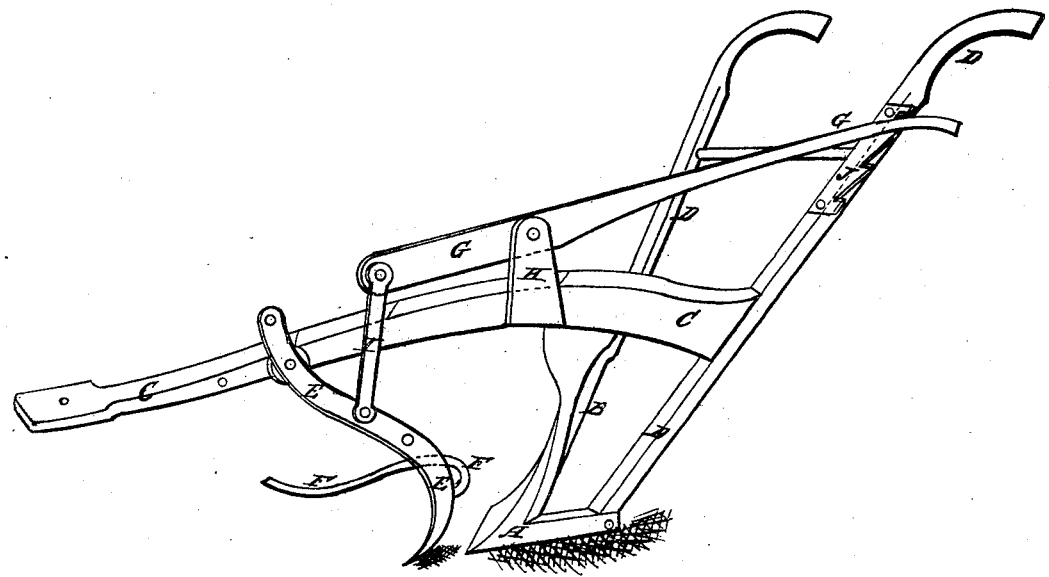
Witnesses:
C. Raettig
Wm. A. Morgan
Inventor:
A. Osburn
E. Walzen
per Munn & Co
Attorneys

United States Patent Office.

ADELBERT OSBORN AND EDWARD WULZEN, OF STREATOR, ILLINOIS.

*Letters Patent No. 86,245, dated January 26, 1869.*

IMPROVEMENT IN STUBBLE-ATTACHMENT FOR PLOWS.

The Schedule referred to in these Letters Patent and making part of the same.

*To all whom it may concern:*

Be it known that we, ADELBERT OSBORN and EDWARD WULZEN, of Streator, La Salle county, Illinois, have invented a new and improved Attachment for Plows; and we do hereby declare that the following is a full, clear, and exact description thereof, which will enable others skilled in the art to make and use the same, reference being had to the accompanying drawing, forming a part of this specification.

The figure is a perspective view of a plow to which our attachment has been attached.

Our invention has for its object to furnish an improved attachment for plows, by means of which corn-stalks, weeds, grass, &c., may be brought into such positions that they may be covered by the soil turned over by the plow; and It consists in the device for this purpose, constructed and arranged as hereinafter more fully described.

A represents the share,

B, the mould-board,

C, the beam, and

D, the handles of a plow, about the construction of which parts there is nothing new.

E is a lever, the forward end of which is pivoted to the beam C, by a bolt passing through one or the other of the holes in the forward part of the lever E, and through one or the other of the holes in the beam C, as shown in the figure, so that the position of the said lever E may be adjusted as required.

The lower or rear end of the lever E is bent or curved downward, as shown in the figure.

The lever E is designed to be adjusted in front of the plowshare, in such a position as to catch the stalks, weeds, &c., that may lie across the line of the furrow, and turn them aside, so that they may be covered by the soil turned over by the advancing plow.

F is a hook, or curved arm, made in about the shape shown in the drawing, one end of which is attached to the hook or bent lever E, and the other end of which slides along the surface of the ground, upon the mould-board side of the plow, so as to bring inclined stalks and weeds, and bend down erect stalks or weeds, into such a position that they may be covered by the soil turned over by the plow.

G is a lever, pivoted to a support, H, attached to the plow-beam.

The forward end of the lever G is connected with the lever-hook F, by a short connecting-bar or rod, I, the upper end of which is pivoted to the forward end of the lever G, and the lower end of which is adjustably pivoted to the hook-lever E, several holes being formed in the said lever E for that purpose.

The rear end of the lever G extends back to the landside plow-handle, D, where it catches upon one or the other of the teeth of the toothed rack J, attached to said handle, according to the position in which it is desired to adjust the hooks E F.

The main purpose of the lever G is to raise the hooks E F away from the ground, for convenience in turning, and to allow stalks, grass, weeds, &c., that may catch upon the said hooks E F, to drop off.

This device may be attached to a right or left-handed plow, as may be desired.

Having thus described our invention,

What we claim as new, and desire to secure by Letters Patent, is—

1. The hook-lever E and hook F, constructed and operating in connection with an ordinary plow, substantially as herein shown and described, and for the purpose set forth.

2. The combination of the lever G with the hook-lever E and hook F, substantially as herein shown and described, and for the purpose set forth.

ADELBERT OSBORN.
EDWARD WULZEN.

Witnesses:
E. F. MALLORY,
BENJAMIN NEWTON.